(12) United States Patent
Gohel et al.

(10) Patent No.: US 10,715,250 B2
(45) Date of Patent: Jul. 14, 2020

(54) CALIBRATING NON-LINEAR DATA

(71) Applicant: Teradyne, Inc., North Reading, MA (US)

(72) Inventors: Tushar K. Gohel, Winchester, MA (US); Frank L. Booth, Jr., Chelmsford, MA (US); John G. Silletto, Belmont, MA (US)

(73) Assignee: TERADYNE, INC., North Reading, MA (US)

( * ) Notice: Subject to any disclaimer, the term of this patent is extended or adjusted under 35 U.S.C. 154(b) by 159 days.

(21) Appl. No.: 15/583,664

(22) Filed: May 1, 2017

(65) Prior Publication Data
US 2018/0316424 A1 Nov. 1, 2018

(51) Int. Cl.
| H04B 10/08 | (2006.01) |
| H04B 17/00 | (2015.01) |
| H04B 10/079 | (2013.01) |
| G01K 13/00 | (2006.01) |
| H04B 10/073 | (2013.01) |

(52) U.S. Cl.
CPC ....... *H04B 10/07955* (2013.01); *G01K 13/00* (2013.01); *H04B 10/0731* (2013.01)

(58) Field of Classification Search
USPC ................................. 398/9, 25, 38
See application file for complete search history.

(56) References Cited

U.S. PATENT DOCUMENTS

| 6,563,352 | B1 | 5/2003 | Gohel et al. |
| 6,894,505 | B2 | 5/2005 | Gohel |
| 7,317,801 | B1 * | 1/2008 | Amir ..................... G10K 11/178 381/71.1 |
| 7,395,479 | B2 | 7/2008 | Gohel et al. |
| 7,420,375 | B2 | 9/2008 | Gohel |
| 8,086,100 | B2 * | 12/2011 | Aronson ................ G01M 11/00 398/25 |
| 8,310,270 | B2 | 11/2012 | Gohel et al. |
| 8,988,081 | B2 | 3/2015 | Gohel et al. |
| 9,240,774 | B2 | 1/2016 | Gohel |

(Continued)

FOREIGN PATENT DOCUMENTS

EP  0 964 524 A2  12/1999

OTHER PUBLICATIONS

File History of U.S. Appl. No. 15/583,554, 69 pages (Retrieved Aug. 24, 2017).

(Continued)

*Primary Examiner* — David C Payne
*Assistant Examiner* — Pranesh K Barua
(74) *Attorney, Agent, or Firm* — Burns & Levinson LLP

(57) ABSTRACT

An example system includes non-transitory machine-readable storage storing calibration data sets. A calibration data set includes parameter values that vary non-linearly. Each of the calibration data sets is temperature-specific. The example system also includes channels over which signals pass to and from units under test (UUTs). A channel includes input circuitry to receive a signal of the signals and to obtain a first parameter based on the signal; and correction circuitry to obtain a second parameter based on the first parameter and based on the calibration data set. The second parameter includes a calibrated version of the first parameter. The calibration data set is selectable based on temperature.

30 Claims, 7 Drawing Sheets

(56) References Cited

U.S. PATENT DOCUMENTS

| | | | |
|---|---|---|---|
| 9,298,866 B1* | 3/2016 | Elmufdi | G06F 30/33 |
| 2003/0099139 A1* | 5/2003 | Abrosimov | G11C 29/56 |
| | | | 365/200 |
| 2003/0206127 A1* | 11/2003 | Roberts | G01R 31/3004 |
| | | | 341/155 |
| 2004/0056666 A1* | 3/2004 | Gohel | G06F 13/4077 |
| | | | 324/539 |
| 2005/0073268 A1* | 4/2005 | Schrodinger | H01S 5/06808 |
| | | | 315/291 |
| 2005/0146320 A1 | 7/2005 | Gohel | |
| 2005/0193275 A1 | 9/2005 | Gohel | |
| 2006/0161827 A1 | 7/2006 | Gohel et al. | |
| 2007/0273439 A1* | 11/2007 | Lin | H03F 1/3247 |
| | | | 330/136 |
| 2008/0109504 A1* | 5/2008 | McDonald | G06F 1/022 |
| | | | 708/275 |
| 2008/0158026 A1* | 7/2008 | O'Brien | G01R 31/2834 |
| | | | 341/94 |
| 2009/0091347 A1 | 4/2009 | Gohel et al. | |
| 2011/0199096 A1* | 8/2011 | Kidambi | H03M 1/1042 |
| | | | 324/615 |
| 2012/0106351 A1 | 5/2012 | Gohel et al. | |
| 2012/0141144 A1* | 6/2012 | Cai | H04L 25/067 |
| | | | 398/202 |
| 2013/0106399 A1 | 5/2013 | Gohel et al. | |
| 2013/0124134 A1 | 5/2013 | Gohel | |
| 2016/0094187 A1* | 3/2016 | Staudinger | H03F 1/0288 |
| | | | 330/295 |
| 2018/0316420 A1 | 11/2018 | Gohel et al. | |
| 2018/0316421 A1 | 11/2018 | Gohel et al. | |
| 2018/0316423 A1 | 11/2018 | Gohel et al. | |
| 2018/0316990 A1 | 11/2018 | Gohel et al. | |
| 2019/0033372 A1 | 1/2019 | Gohel et al. | |

OTHER PUBLICATIONS

File History of U.S. Appl. No. 15/583,608, 73 pages (Retrieved Aug. 24, 2017).

File History of U.S. Appl. No. 15/583,630, 79 pages (Retrieved Aug. 24, 2017).

File History of U.S. Appl. No. 15/583,686, 77 pages (Retrieved Aug. 24, 2017).

International Search Report for PCT/US2018/025643, 4 pages (dated Jul. 16, 2018).

Written Opinion for PCT/US2018/025643, 9 pages (dated Jul. 16, 2018).

International Preliminary Report on Patentability for PCT/US2018/025643, 8 pages (dated Nov. 14, 2019).

* cited by examiner

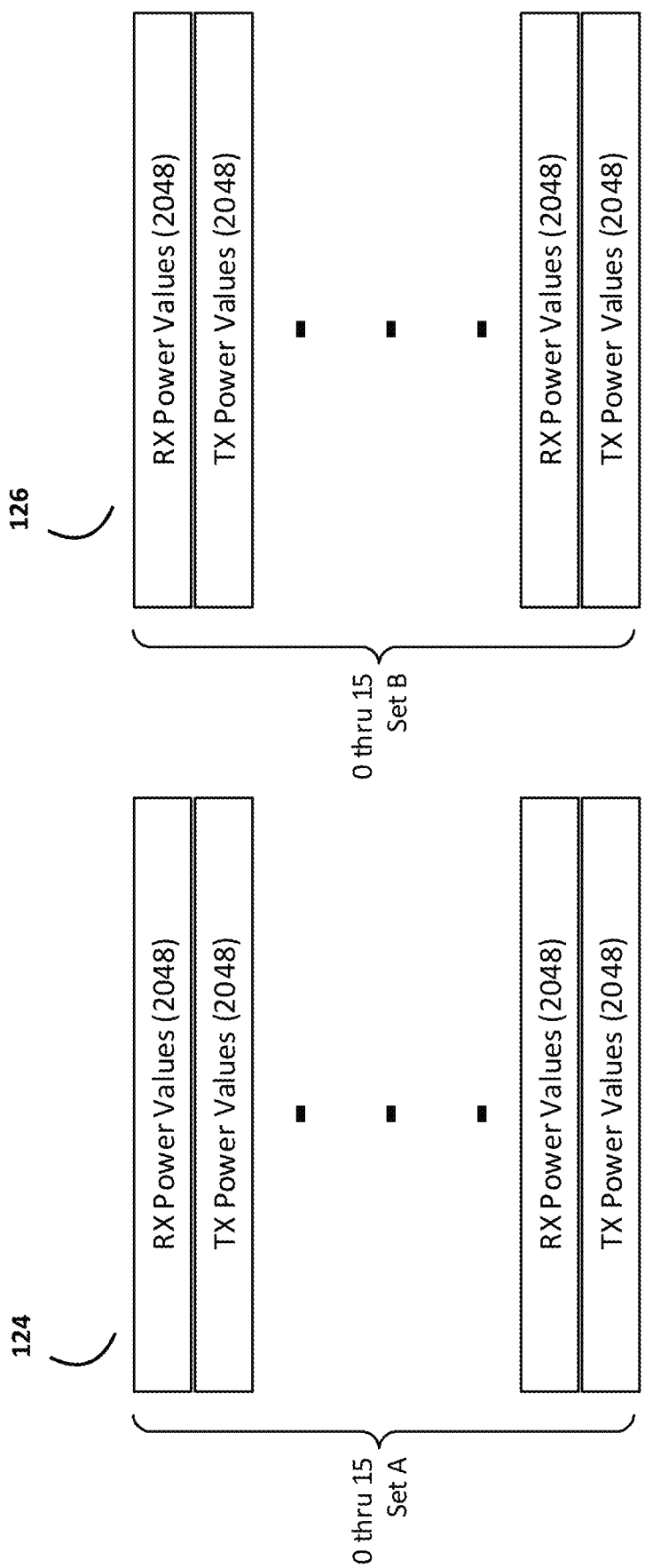

CALIBRATING NON-LINEAR DATA

TECHNICAL FIELD

This specification relates generally to calibrating non-linear data.

BACKGROUND

A signal includes informational content and characteristics other than informational content. For example, an optical signal may have an optical power level, which is a measure of the energy delivered by the optical signal per unit of time. In another example, an electrical signal may have a signal-to-noise ratio, which reflects the relative amounts of signal and noise in a transmission. These signal characteristics that do not represent the informational content of the signal are referred to as parametric information, and may be represented by data, called parametric data.

In some cases, the parametric data is measured on a non-linear scale. For example, optical power is measured in decibels (dB), which is on a logarithmic scale. The equation used to calculate optical power in decibels is dB=10 log (ratio of measured power/reference power).

SUMMARY

An example system comprises non-transitory machine-readable storage storing calibration data sets. A calibration data set among the calibration data sets comprises parameter values that vary non-linearly. Each of the calibration data sets is temperature-specific. The example system also comprises channels over which signals (or electrical signals, in some examples) pass to and from units under test (UUTs). A channel among the channels comprises: input circuitry to receive an signal (e.g., an optical signal) of the signals and to obtain a first parameter based on the signal; and correction circuitry to obtain a second parameter based on the first parameter and based on the calibration data set. The second parameter comprises a calibrated version of the first parameter. The calibration data set is selectable from among the calibration data sets based on temperature. The example system may include one or more of the following features, either alone or in combination.

The example system may comprise a temperature monitor that is configured to monitor the temperature in real-time. The temperature may be the temperature of the channel. The temperature from the temperature monitor may be usable to select the calibration data set. The input circuitry may be configured to obtain the first parameter by measuring the signal. The first parameter may comprise a first optical power value, and the second parameter may comprise a second optical power value. The second optical power value may be different from the first optical power value.

Each calibration data set may be stored in lookup tables (LUTs). The selected calibration data set may comprise: a first LUT storing parameter values in relation to indices, with a first index among the indices being selectable based on the first parameter; and a second LUT storing indices in relation to calibration values, with a calibration value among the calibration values being selectable based on the first index, and with the second parameter being based on the calibration value. The indices of the first LUT may each correspond to a different bin among a number of bins. Each different bin may correspond to a different range of parameter values between a maximum parameter value and a minimum parameter value. A size of each range may be the same, and the first parameter may be within one of the bins that corresponds to the first index. Each of the parameter values may be represented by a same number of bits. There may be a non-linear relationship between a smallest of the parameter values and a largest of the parameter values. The number of bits of each parameter value may represent a binary number. Lower order bits affect selection of a smaller parameter value more than the lower order bits affect selection of larger parameter value. Each of the parameter values may be represented by N bits resulting in a possible $2^N$ parameter values. Each of the first LUT and the second LUT may have less than $2^N$ entries. Each of the first LUT and the second LUT may have less than $2^N/X$ entries, where X may be any appropriate number, e.g., 5000, 1000, 500, etc.

The example system may comprise a temperature sensor to obtain the temperature of, or associated with, the channel. The first LUT and the second LUT may be selectable in real-time based on the temperature obtained by the temperature sensor. The input circuitry may be configured to receive the signal, to convert the signal into a digital signal, and to obtain the first parameter based on the signal. The first parameter may comprise one or more signal characteristics other than informational content. The first parameter may comprise one or more of the following information about the signal: power level, signal-to-noise ratio, modulation amplitude, extinction ratio, wavelength, rise time, fall time, slew rate, or any other characteristic relating to a wave or the wave's shape.

The example system may include processing hardware (e.g., an FPGA) to implement a state machine, and cache memory. The state machine may be configured to move the calibration data set into the cache memory, and to control the system to use the calibration data set in the cache memory following an event.

An example method may include operation comprising storing calibration data sets in non-transitory machine-readable storage, with a calibration data set among the calibration data sets comprising parameter values that vary non-linearly, and with each of the calibration data sets being temperature-specific. The example method may also include operations comprising selecting the calibration data set based on temperature associated with a communication channel; receiving an signal over the communication channel; obtaining a first parameter based on the signal; and obtaining a second parameter based on the first parameter and based on the calibration data set. The second parameter may comprise a calibrated version of the first parameter. The example method may include any one or more of the foregoing features of the example system, as appropriate, either alone or in combination.

One or more switch that can independently switch informational content data and multiple types of signal parametric data from a single input to different outputs.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DESCRIPTION OF THE DRAWINGS

FIG. 7 is a block diagram showing examples of caches to hold calibration values.

Like reference numerals in different figures indicate like elements.

DETAILED DESCRIPTION

Figure 1:
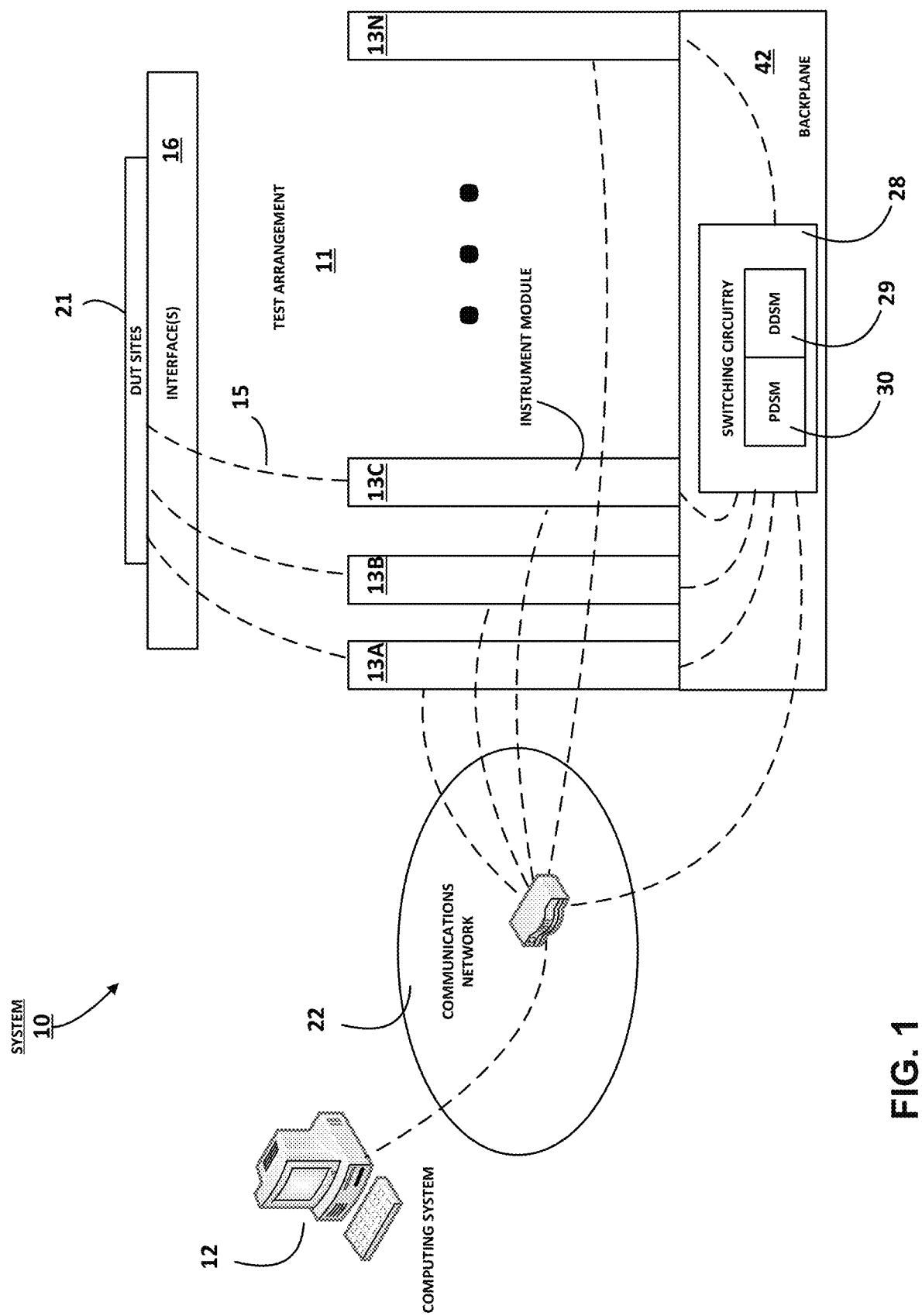
FIG. 1 is a block diagram of components of an example system that incorporates an implementation of the switch matrix system described herein.

Described herein are example systems that include multiple instrument modules. Each of the instrument modules is configured to communicate with one or more devices being tested by the system, and also to communicate with other instrument modules that are part of the system. A device being tested is referred to herein as a device under test (DUT) or a unit under test (UUT). Each instrument module is part of a communication channel (or simply, "channel"), over which communications occur. The instrument modules communicate with each other over one or more transmission media on a backplane or other appropriate structure to which the instrument modules interface. For example, the instrument modules may communicate via one or more serial buses on the backplane or via an Ethernet-based network.

Switching circuitry, which may reside on the backplane or at another appropriate location in the system, directs communication data to and from different instrument modules/communication (e.g., test) channels. The switching circuitry enables, among other things, any appropriate communication data to be transmitted from one channel to multiple channels (via their respective instrument modules), from multiple channels to one channel, or from one channel to another, different channel. The communication process may include replicating all or part of the communication data as closely as possible on one or more other channel(s), or processing the communication data and transmitting the resulting processed communication data, as appropriate. The communication process may also include substituting user-provided, or other, communication data for existing communication data, where appropriate.

The communication data may include data that represents both informational content and data that represents one or more signal characteristics other than informational content. Informational content includes the information being transmitted in a signal optically or electrically (e.g., a bit stream). Data that represents the informational content of a signal is referred to herein as the informational content data. Data that represents one or more signal characteristics of a signal other than informational content is referred to herein as parametric data. For example, in some implementations, an instrument module may receive an input signal. The input signal may be optical or electrical; however, for illustration, an optical signal is received in this example. The optical signal may represent, for example, test data from a UUT or commands from a host computing system to control testing. The optical signal may be received over one or more optical fibers interfaced to, or otherwise in communication with, the system. The optical signal represents information, as indicated, but also has other characteristics. For example, the optical signal may have an optical power level (also referred to as optical signal power or optical signal power level), a signal-to-noise ratio, a modulation amplitude, an extinction ratio, and a wavelength. The instrument module receives the optical signal and converts the optical signal into an electrical (e.g., digital) signal comprising informational content data representing the informational content of the optical signal (e.g., the test data, commands, etc.). The instrument module also captures the other characteristics—the parametric information—associated with the optical signal, and generates parametric data representing this parametric information. Both the informational content data and the parametric data may constitute the communication data referred to above, and may be transmitted among the instrument modules and associated communication channels.

As indicated above, the input signal may also be an electrical signal. The electrical signal may be a digital signal or an analog signal, for example. Electrical signals also have associated parametric information, such as signal-to-noise ratio, amplitude values, and so forth. Thus, an instrument module may receive an electrical signal—which may be analog or digital—generate informational content data representing the informational content of the received electrical signal, and generate parametric data representing the parametric information associated with the electrical signal. The processing described herein for the resulting informational content data and parametric data is substantially the same regardless of whether the original input signal is optical or electrical. For this reason, the following addresses receipt of an optical signal only, with the understanding that the processing described applies equally in cases where the original input signal is electrical. Also, individual channels may contain more than one informational stream and, although the processing described herein relates to individual streams per channel, the processing described herein likewise applies to multiple streams per channel.

In some implementations, the switching circuitry comprises a first switching circuit and a second switching circuit. The first switching circuit is referred to as the signal switching circuit or the digital data switch matrix (DDSM), since this switching circuit provides, or distributes, to various instrument modules/communication channels, the informational content data representing the original signal. In some implementations, the DDSM is a single part that is a full cross-point switch and that is configured to operate on high-speed digital data. In an example, high-speed data may include data that is transmitted on the order of gigabits-per-second (Gb/s); however, the DDSM is not limited to use with such data transmission speeds. The DDSM may be configured to receive informational content data on one channel's input and to reproduce that informational content data on any number of desired outputs. In some implementations, the DDSM does not capture any data in memory; it simply makes a copy of the data on each desired output. In some implementations, the DDSM may store data in on-board memory. In some implementations, the DDSM has input buffers and re-drivers.

The second switching circuit is referred to as the parametric switching circuit or the parametric data switch matrix (PDSM), since this switching circuit provides, or distributes, to various instrument modules/communication channels, parametric data representing one or more signal characteristics other than informational content. In some implementations, the PDSM is a virtual switch matrix that enables high-speed serial communication of individual channels' parametric data transmitted among instrument modules in real-time. The system architecture supports parametric data of all appropriate types including, but not limited to, optical power levels, signal-to-noise ratio, modulation amplitude, extinction ratio, wavelength, rise time, fall time, slew rate, or any other characteristic relating to a wave or the wave's shape. In some implementations, the use of the PDSM is optional. In such implementations, a host computing system can simply select a desired output parameter (e.g., power level) for each channel and ignore the measured parameter at the input. The selected data can be transmitted to multiple channels simultaneously. In some implementations, the PDSM is configured to obtain parametric data from one or more instrument modules and is configured to transmit any module's port and channel parametric data to any other module's port and channel. This operation may be done on a continual basis as the data in question is changing. The PDSM may obtain parametric data from both input and output ports. In some implementations, either the PDSM or the DDSM is not used.

Some implementations may employ a different switch matrix configuration than that described here. For example, in some implementations, a single switch matrix may handle both the informational content data and the parametric data. For example, a single hardware switch may include both PDSM and DDSM functionality.

The DDSM and the PDSM may be configured, or controlled, to operate in parallel. For example, the DDSM may be configured to transmit informational content data at the same time as the PDSM transmits parametric data, and the PDSM may be configured to transmit parametric data at the same time as the DDSM transmits informational content data. In some implementations, the DDSM and the PDSM may be configured, or controlled, to operate independently or in concert to distribute their respective data to appropriate communication channels of the instrument module.

In an example operation, an example instrument module #1 may receive an input optical signal, convert that optical signal into informational content data (e.g., a digital signal) representing the informational content of the optical signal, and, during the conversion process, obtain parametric data representing the optical power of the optical signal (a non-informational characteristic of the optical signal). The informational content data and the parametric data may be sent over appropriate transmission media from the instrument module to the switching circuitry (e.g., the informational content data to the DDSM and the parametric data to the PDSM). The switching circuitry, in this example, may be configured, e.g., by a host computing system, to provide the informational content data to example instrument modules #2, #3, and #4, and to provide the parametric data to example instrument modules #4, #5, and #6. Instrument module #4 may use both the informational content data and the parametric data to replicate, on its output communication channel, the optical signal originally received by instrument module #1. That is, the optical signal output by instrument module #4 may be generated using the informational content data and the parametric data to have the same informational content and non-informational characteristics (e.g., optical power) as the optical signal received by instrument module #1. Instrument modules #2 and #3 may output an optical signal representing the informational content data and having any appropriate parametrics, the data for which may be stored in the respective instrument modules or received from elsewhere. Instrument modules #5 and #6 may use the received parametric data to generate optical signals having the same optical power as the optical signal received by instrument module #1. The informational content data used to generate the informational content of the optical signals output by instrument modules #5 and #6 may be obtained from any appropriate source. Other examples of functionalities available through the instrument modules are provided below.

In some implementations, the switching circuitry does not process data, but rather is only configurable to transmit data from one location to another location. In some implementations, the switching circuitry may include on-board intelligence that enables processing of the data prior to output from the switching circuitry. In any case, processing device(s) either on, or off, the backplane, may process the informational content data and/or the parametric data prior to distribution by the switching circuitry or following distribution by the switching circuitry. Processing may include, but is not limited to, changing the content of the data, changing a timing of the data, changing packet headers for the data, and so forth. Therefore, rather than providing the informational content data and the parametric data received, the switching circuitry may provide modified versions of that data to the various instrument modules/transmission channels. In some implementations, the switching circuitry may substitute designated informational content data and/or parametric data for different data, where the different data may be specified by a processing device, such as the host computing system or an on-board FPGA, based on programmatic input.

FIG. 1 shows components of example system 10 that incorporates an example switch matrix system. Notably, however, the switching matrix system described herein is not limited to use in the context of testing or to use with the example system described herein, but rather may be used in any appropriate technical context, including outside of a testing environment. In FIG. 1, the dashed lines represent, conceptually, potential signal paths between components of the system. In this regard, in some implementations, the host computing system does not communicate directly with the instrument modules. Rather, there is a local bus handled by a field programmable gate array (FPGA) on the backplane that handles communication between the instrument modules and the host computing system. In some implementations, the FPGA that handles the communications is the same FPGA that implements the PDSM.

System 10 includes a test arrangement 11 and a host computing system 12. Test arrangement 11 may include interface(s) to one or more UUTs (not shown) on which tests are performed, and host computing system 12 communicates with components thereof to control testing. For example, host computing system 12 may download test program sets to instrument modules on the test arrangement, which then run the test program sets to test UUTs in communication with the test arrangement. Host computing system 12 may also send, to instrument modules in the test arrangement, instructions, test data, and/or other information that is usable by the corresponding instrument module to perform appropriate tests on a UUT interfaced to the test arrangement. In some implementations, this information may be sent via a computer network. Host computing system 12 may configure the DDSM and the PDSM based on user-provided, or other, programmatic inputs. The programming may specify switch configurations within the DDSM and the PDSM, or other appropriate operations or configurations. The DDSM and PDSM may be programmed and reprogrammed in real-time, as appropriate. In some implementations, the foregoing information may be sent via an optical network comprised of fiber optic lines that transmit optical signals between the instrument modules and the computer. Conversions between optical and electrical signals may be performed by the host computing system and by the respective instrument modules, as described herein. In some implementations, the foregoing information may be sent via a computer network, such as a local area network (LAN) or a wide area network (WAN).

In the example of FIG. 1, system 10 includes multiple instrument modules 13A to 13N, each of which may be configured, as appropriate, to perform one or more of the functions described herein. Although only four instrument modules are depicted, the system may include any appropriate number of instrument modules, including those residing outside of test arrangement 11. In some implementations, each instrument module may be configured to output test signals to test a UUT based, e.g., on data provided by the host computing system, and to receive signals from the UUT. Different instrument modules may be configured to perform different tests and/or configured to test different UUTs. The signals received may include response signals that are based on the test signals and/or signals that originate from the UUT that are not prompted by (e.g., are not in response to) test signals. In some implementations, there may be electrical connections between the UUT and the instrument modules, in which case the test data and response signals may be sent electrically. In some implementations, there may be optical connections between the UUT and the instrument modules, in which case the test data and response signals may be sent optically. In some implementations, there may be direct fiber optic lines/links between the UUTs and the instrument modules, over which optical signals are transmissible. In some implementations, there may be an optical network between the UUTs and the instrument modules, over which optical signals are transmissible. In some implementations, there may be a combination of optical and electrical transmission media between the instrument modules and the UUTs. In some instances the UUT may only interface with instrument modules through the DDSM or PDSM.

Each instrument module may include input circuitry (e.g., an interface card) for receiving signals from one or more UUTs or other appropriate signal source(s). Each instrument module may include output circuitry for outputting signals to a communication channel defined by the instrument module. In some implementations that employ optical communications, each instance of the input circuitry includes an interface circuit configured to receive an optical signal, configured to convert the optical signal to an electrical (e.g., a digital) signal, configured to obtain parametric information about the optical signal before, during, or after the conversion process, and configured to obtain parametric data based on the information (e.g., to generate digital data representing the parametric information). In an example, the parametric information may be measured by the interface circuit and converted to digital parametric data by the interface circuit or other appropriate logic. In some implementations, the interface circuit may be implemented using a device, such as an FPGA, an application-specific integrated circuit (ASIC), or other appropriate hardware.

In some implementations, one or more instrument modules include one or more optical interfaces that are designed to support 850 nanometers (nm) multi-mode optical communication from 1 Gb/s to 12 Gb/s or higher. In some implementations, other types of optical interfaces may be used, or no optical interfaces may be used.

Figure 2:
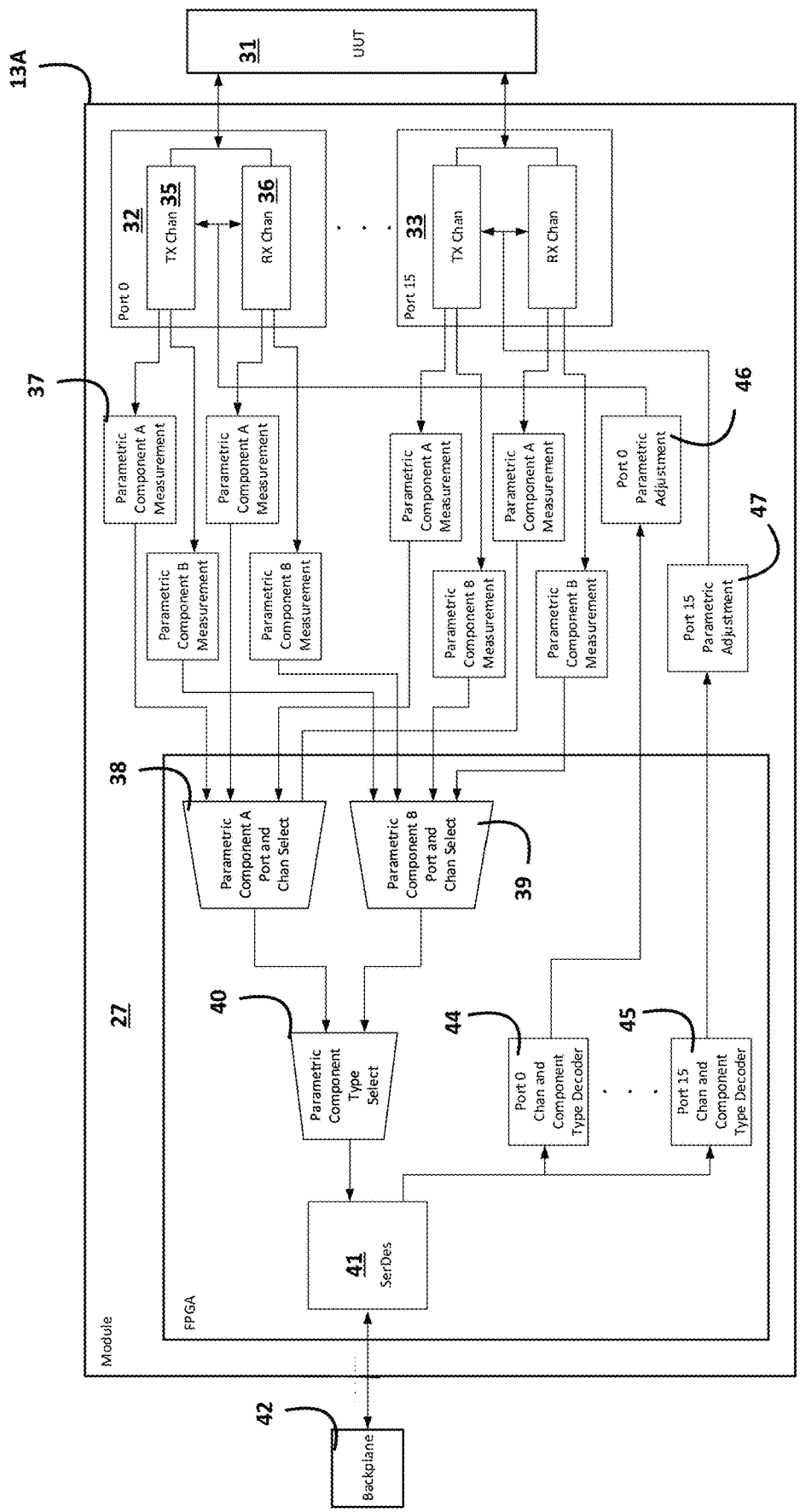
FIG. 2 is a block diagram of components of an example instrument module for transmitting parametric data from an instrument module to a backplane.

FIG. 2 shows an example implementation of circuitry 27 that may be included in an instrument module, such as 13A. In this example, instrument module 13A interfaces to a UUT 31 and exchanges test and response signals with that UUT. In this example instrument module 13A includes sixteen ports, of which two, 32 and 33, are shown. Each port includes a transmit channel ("TX Chan") 35 and a receive channel ("RX Chan") 36. The receive channel is part of the input circuitry, and is configured to receive signals from the UUT or elsewhere. The transmit channel is part of the instrument module's output circuitry, and is configured to output signals to the UUT or elsewhere. Circuitry 27 includes parametric measurement circuits, an example of which is 37. In this example, two parametric components, A and B (e.g., optical power and wavelength, respectively), are measured. Therefore, there is one corresponding parametric measurement circuit for each transmit and receive channel. That is, one parametric measurement circuit for a channel measures component A and one parametric measurement circuit for that channel measures component B. Parametric data representing those parametric components is sent from each channel to multiplexers 38 and 39—one for each parametric component, A and B. Multiplexers 38 and 39 each select data from channels designated, e.g., by the host computing system. Multiplexer 40 selects whether to provide parametric data for component A or for component B to the serial bus transmission circuit 41, which passes that data to backplane 42. Circuitry 27 also includes decoders—one for each channel, of which two, 44 and 45, are shown. These decoders transmit, to the input circuitry, information that is usable to adjust parametric data (via circuits 46 and 47) at the various ports.

Referring also to FIG. 1, the instrument modules may be interconnected through backplane 42 or any other appropriate electrical or mechanical mechanism. For example, instrument modules 13A to 13N may mechanically interface, e.g., plug into, backplane 42 of FIG. 1. Backplane 42 may include one or more transmission media over which communications pass among the various instrument modules. For example, the transmission media may be, or include, one or more serial buses such as a peripheral component interconnect express (PCIe) bus, Ethernet cable, or other appropriate media. In the case of a PCIe bus, the parametric data may be encapsulated in PCIe bus packet format and transmitted from instrument module logic (e.g., an FPGA) to the PDSM. In some implementations, different parametric data types may be stored in different packets. In some implementations, the PDSM decodes incoming PCIe bus packets and stores the decoded parametric data in data-type-specific random access memory (RAM), which may also reside on the backplane and which may be accessed by the instrument modules and the host computing system. Bus protocols other than PCIe and other types of encapsulation may be used.

Communications among the instrument modules pass through switching circuitry 28 which, as described herein, includes one or more programmable switching matrices (e.g., the PDSM and the DDSM) in some implementations.

Switching circuitry 28 is configurable to receive informational content data and parametric data, and to distribute the informational content data and parametric data among the instrument modules. As explained, informational content data received from an instrument module may be provided to one or more of the same communication channels, or to one or more different communication channels. Parametric data received from an instrument module may be provided to one or more of the same communication channels, or to one or more different communication channels. In some implementations, some of the informational content data may be sent to one set of channels, and some of the parametric data may be sent to another set of channels, with the first and second sets overlapping, at least in part. In some implementations, the informational content data and the parametric data may be sent to different numbers of channels or to the same number of channels. Basically, any routing that is appropriate may be implemented. In some implementations, instrument modules may receive data from the switching circuitry, manipulate that data, and send the data back to the switching circuitry.

In this regard, in some implementations, instrument modules in the system may vary in capabilities. In an example, an instrument module, such as instrument module 13A of FIG. 1, receives an input signal—which may be an optical signal or an electrical signal—and separates the input signal's informational content data component (bit stream) from the input signal's parametric component. The system processes each component separately. The system also supports the testing of each signal's informational content component and parametric components, as well as the retransmission of these components, e.g., to another instrument module through an appropriate switch. In some implementations, the system is configured so that, through appropriate programming, the bit stream on a channel may be reproduced on any other channel output, and that bit stream may have output parameters that can be specified programmatically in absolute terms or relative to one or more references, such as the parameters of another channel.

As explained, on some implementations, switching circuitry 28 may include a first switch (the DDSM 29) to handle distribution of the informational content data, and a second switch (the PDSM 30) to handle distribution of the parametric data. Each switch 29 and 30 may be programmable and/or under control of host computing system 12 in the manner described herein. In some implementations, as noted, each switch 29 and 30 may, or may not, have on-board intelligence that enables processing its respective data prior to output to the instrument modules/communication channels. In some implementations, the DDSM is implemented using a cross-point switch matrix; and, in some implementations, the PDSM is implemented using an FPGA. In some implementations, the DDSM is implemented using a cross-point switch matrix that receives and forwards data without performing any processing on the data; and, in some implementations, the PDSM is implemented using an FPGA that receives and forwards data and is also capable of performing processing on the data. However, hardware other than that described herein may be used to implement the DDSM and the PDSM. The DDSM and/or the PDSM may be capable of processing data.

Figure 3:
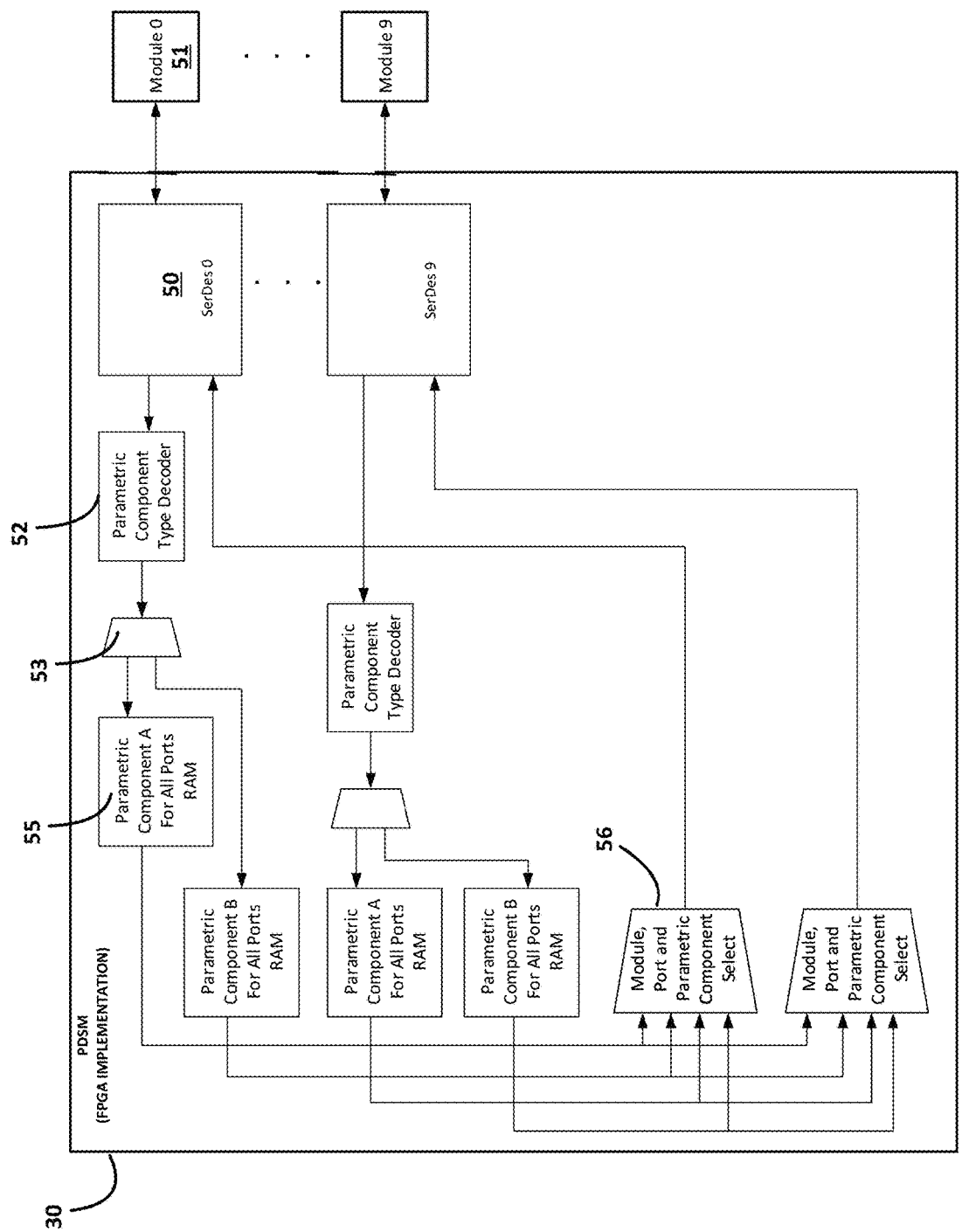
FIG. 3 is a block diagram of components of an example parametric data switch matrix that may be included in the example system.

An example implementation of PDSM 30 is shown in FIG. 3. PDSM 30 includes an input interface 50 for passing data received (RX) from an instrument module 51, and for passing data to be transmitted (TX) data to the instrument module. A decoder 52 (one for each receive channel) decodes parametric data passed as PCIe packets to the PDSM, and outputs parametric data to a input demultiplexer, an example of which is 53. Each input demultiplexer (e.g., 53) receives all parametric data components for the same input or output interface from all ports of the instrument module and outputs those parametric data components to parametric data RAM, an example of which is 55. That data is output from RAM, at an appropriate time, to one or more multiplexers, an example of which is 56. Control over the output may be implemented by a host computing system or any other appropriate computing device, such as an on-board FPGA. The output multiplexer sends the parametric data, as appropriate, to a transmit output for transmission to an instrument module or retransmission back to the switch through another, different instrument module. As shown, the PDSM is implemented using an FPGA in this example.

Referring back to FIG. 1, a separate processing device, which may or may not reside on the backplane, may perform processing before, during, or after distribution implemented by the switches. In some implementations, processing may be directed by, or under control of, host computing system 12, which is described below. In some implementations, the processing may be performed in the instrument modules. In some implementations, network 22 communicates through transmission media and logic on the backplane 42 with instrument the modules.

In some implementations, host computing system 12 communicates with the instrument modules via the backplane over a network 22, which may be an appropriate Ethernet-based communication network, an appropriate optical network, a wireless network, or some combination thereof. Thus, in some implementations, network 22 may be, or include one or more optical networks, including fiber optic links between the host computing system and the instrument modules In some implementations, network 22 may be, or include, a LAN, wide area network (WAN), or a combination thereof. In some implementations, network 22 may be, or include, a combined optical and electrical network between the host computing system and instrument modules.

In the example of FIG. 1, system 10 also includes one or more interfaces 16 that connects, optically, electrically and/or mechanically, to components of test arrangement 11, such as the instrument modules. The interface(s) each define one or more sites 21, which may include pins, traces, or other points of electrical, optical, and/or mechanical connection to which one or more UUTs may connect—e.g., one UUT per site. Test signals, response signals, and other information pass over the sites between the UUT and instrument modules 13A to 13N. Connections between the instrument modules and the UUTs may be optical, electrical, or a combination thereof. In some implementations, each instrument module may include a separate interface, e.g., an optical interface, that connects, through optical transmission media, directly to a UUT.

In an example implementation, the system supports up to ten modules—each having sixteen channel inputs and sixteen channel outputs—that plug into a backplane, such as backplane 42. Other implementations, however, may have different numbers of modules, channels, ports, and the like. The backplane includes hardware to implement the switch matrix functionality described herein (e.g., the switching performed by the DDSM and the PDSM). As described, the example system may be configured to capture all information about a signal at an input and to reproduce that same signal at the output. This includes the informational content component (e.g., a bit stream) as well as parametric components, such as the power levels, waveform, and the like.

In an example, the switching circuitry may be configured to connect a signal from one channel to another channel, and to preserve the power level of the signal on that other channel. In an example operation, the DDSM passes data for that signal to the other channel/instrument module. The PDSM provides the instrument module that controls the output signal with the measured power levels of the input channel. The instrument module then produces a signal using the informational content data of the original signal and having the power level represented by the parametric data. The same concepts can be used for margin testing. For example, a user may want to emulate an optical fiber having a 2 decibel (dB) loss. The user can program the output of an instrument module to always produce a signal having an output power level that is 2 dB less than a power level measured at its input. The system also supports adding gain, e.g., programming the output of an instrument module to always produce a signal having an output power level that is 2 dB greater than the power level measured at an input.

In some implementations, the host computing system can configure the PDSM so that parametric data from any appropriate port and channel can be sent to any other appropriate port and channel. The host computing system can also program the system so that parametric data is not sent to any given port or channel on a per channel basis. After a configuration is defined, the PDSM may send parametric data encapsulated in PCIe packet format to all designated instrument modules, ports, and channels. In some implementations, the configuration can be modified in real-time.

In some implementations, each instrument module may be configured to implement functions to support the PDSM. A first example function includes continually measuring the parametric data of ports and channels of the instrument module. A second example function includes obtaining all of the parametric data measurements for input signal(s) and sorting those parametric data measurements into types—e.g., into parametric components A and B of FIG. 2. After sorting, the parametric data measurements are encapsulated in formatted packets and sent to the backplane over an appropriate serial bus. A third example function includes receiving, per port and per channel, parametric data from the backplane and applying the individualized parametric data to the corresponding port and channel within the instrument module.

In some implementations, the PDSM on the backplane, on an ongoing basis, receives and decodes high-speed serial data from each of the instrument modules connected to the backplane, or a subset thereof. The PDSM multiplexes the received data serially back to the appropriate module(s).

In some implementations, an active control loop between communication channels is configured to stabilize and to provide an optical signal having desired parametric characteristics. For example, in some implementations, the active control loop may be a power control loop to provide an output optical signal having a stable, and defined, optical power level. Notably, however, the active control loop is not limited to providing an optical signal having power characteristics. Rather, the active control loop may be configured to provide an output optical signal having any one or more parametric characteristics including, but not limited to, a specified optical power, signal-to-noise ratio, modulation amplitude, extinction ratio, wavelength, rise time, fall time, slew rate, or any other characteristic relating to a wave or the wave's shape.

Figure 4:
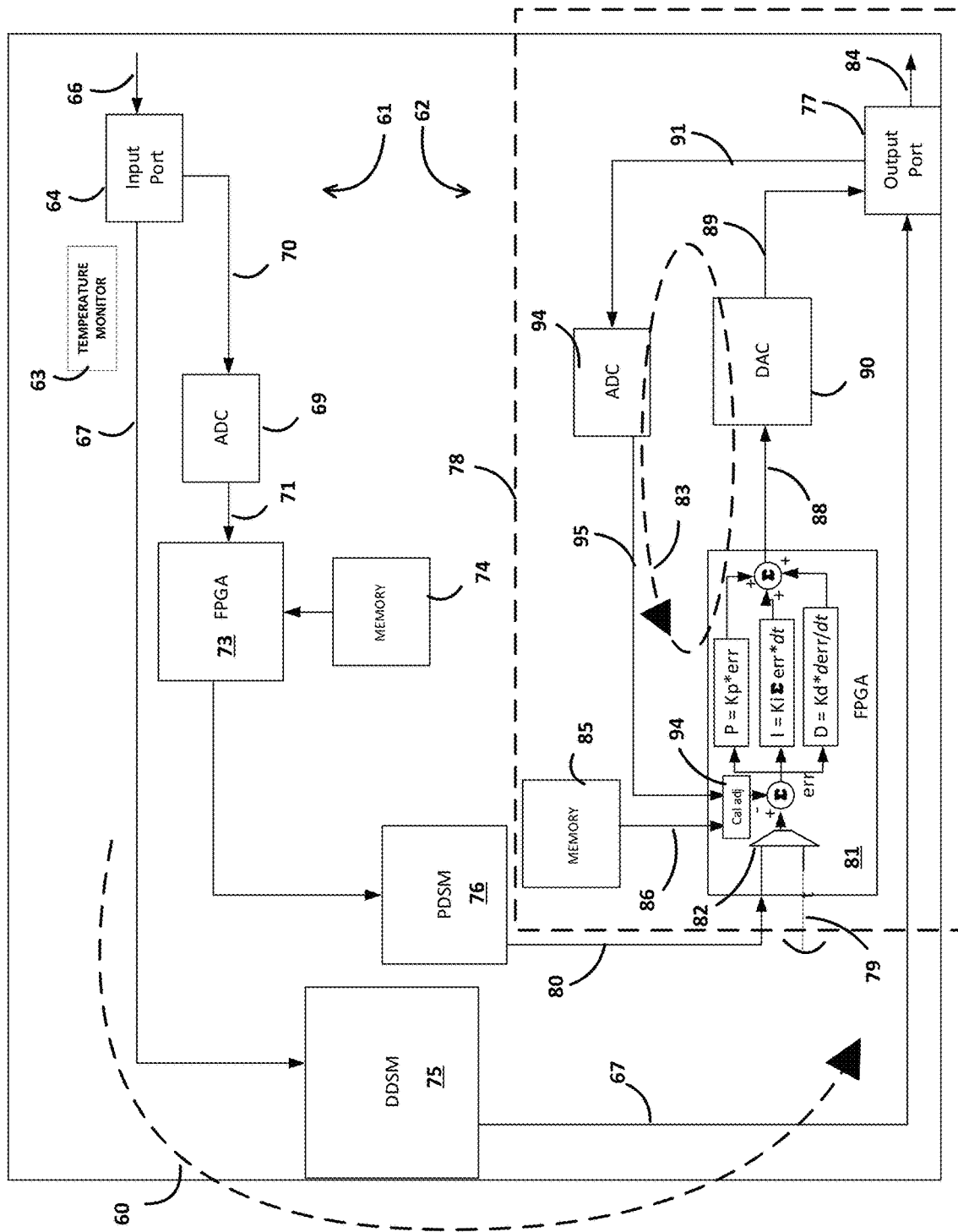
FIG. 4 is a block diagram showing an example of an active control loop for controlling parametric information on channels.

FIG. 4 shows an example implementation of an active control loop 60 for controlling parametric and informational content data transfers between two communication channels. In some implementations, the active control loop may be configured to stabilize parametric data at the output (e.g., to eliminate or reduce spikes or noise in the parametric data) Active control loop 60 is a represented conceptually by a dashed curve having an arrow that shows an example direction of control/data flow.

FIG. 4 shows only two example communication channels; however, the active control loop described herein may be implemented among more than two communication channels, as appropriate. The communication channels may include an input channel 61 and an output channel 62, although the channels may be two input channels or two output channels, as described below. In some implementations, the input channel includes circuitry configured to receive an optical signal, to convert the optical signal to an electrical (e.g., a digital) signal, to obtain parametric information about the optical signal before, during, or after the conversion process, and to obtain parametric data based on the information (e.g., to generate digital data representing the parametric information). In an example, the parametric information may be measured by an interface circuit and converted to digital data by the interface circuit or other appropriate logic. In some implementations, the output channel includes circuitry configured to receive an electrical (e.g., a digital) signal, to convert the electrical signal to an optical signal, to obtain parametric information about the optical signal before, during, or after the conversion process, and to obtain parametric data based on the information (e.g., to generate digital data representing the parametric information). In an example, the parametric information may be measured by an interface circuit and converted to digital data by the interface circuit or other appropriate logic.

In the example of FIG. 4, channel 61 includes an optical input port 64 comprising an interface configured to receive an optical signal 66, and to generate informational content data 67 representing the informational content of the optical signal. Input port 66 is also configured to measure parametric information for the optical signal, such as, but not limited to, optical power level, signal-to-noise ratio, modulation amplitude, extinction ratio, wavelength, rise time, fall time, slew rate, or any other characteristic relating to a wave or the wave's shape. In this example, the parametric information represents the optical power level of the optical signal; however, as noted, the parametric information may represent any appropriate parametric characteristic of the optical signal. In this example, channel 61 also includes an analog-to-digital converter (ADC) 69. ADC 69 receives the measured parametric information 70, and converts that information into digital data; that is, parametric data 71. Thus, the input port and ADC capture the parametric data, and forward that parametric data to multiplexers of the type shown in FIG. 2 (e.g., 38, 39, 40) on programmable logic, such as an FPGA 73.

In the example of FIG. 4, memory 74 stores calibration data, e.g., parameter values, that may be used to calibrate the parametric data. The calibration data may be specific to the input port, and may be used to correct for errors produced by the input port. For example, the input port may include a photodiode. The photodiode and associated circuitry may have physical or optical characteristics that cause it to operate in a way other than expected, particularly at different temperatures, resulting in parametric information (and, thus, parametric data) containing an error component. The calibration data may be applied to the parametric data via logic in the FPGA to correct for this error component. In this regard, calibration may be used to correct for any appropriate errors and not solely for photodiode errors. An example of error correction of parametric data is described below with respect to output channel 62.

As described above with respect to FIGS. 2 and 3, DDSM 75 transmits informational content data between channels 61 and 62, and PDSM 76 transmits parametric data between channels 61 and 62. As shown in FIG. 4, DDSM 75 transmits the informational content data to output port 77. PDSM 76 transmits the parametric data 80 to output circuitry 78, which is located on a path of the output channel. In an example, the parametric data may be, or may be based on, the parametric data that was obtained from the optical signal at channel 61. In some implementations, the parametric data may be independent of the parametric data for channel 61 and may be provided to output circuitry 78 from a source unrelated to channel 61. For example, parametric data 79 may be programmed into the system, e.g., by the host computing system, and may be provided to the output circuitry from there. Such parametric data may be defined by a user to control the target parameter(s) (e.g., optical power level) of the output signal. In some implementations, parametric circuitry other than the PDSM described herein or the hardware used to provide the programmatic inputs may be used.

In the example of FIG. 4, output circuitry 78 includes programmable logic 81, which may be an FPGA or other appropriate programmable device. In some implementations, the functionality implemented therein described below may be implemented using discrete logic components, an ASIC, or other appropriate circuitry.

Output circuitry 78 includes a selector circuit 82, such a multiplexer, to select between the parametric data 80 provided by PDSM 76 or the parametric data 79 provided via programmatic (or other) input. Selection may be controlled by one or more processing devices that are either on, or off, the backplane. For example, selection may be controlled by the host computing system of FIG. 1 or using input(s) from the host computing system. The selected parametric data is the parametric data that is usable by the output circuitry to produce an optical signal having the informational content of the informational content data 67 and the parametric characteristics of the selected parametric data (either parametric data based on parametric data obtained from channel 61 or parametric data otherwise specified, e.g., programmatically).

In the example of FIG. 4, the output circuitry includes an error correction loop 83 to calibrate, e.g., to correct, for errors introduced by hardware in the output port or elsewhere, such as a photodiode. Error correction loop 83 is a feedback loop represented conceptually by a dashed ellipse having an arrow that shows the direction of feedback. In some implementations, however, this internal error correction loop may be omitted. In example implementations like this, the selected parametric data and the informational content data are both provided directly to the output port 77. The output port then generates an optical signal 84 having the informational content of the informational content data and the parametric characteristics of the selected parametric data.

The example of FIG. 4, however, includes error correction loop 83. In this example, the error correction loop comprises a proportional, integral, derivative control loop configured to calculate an error value ("err") of the output optical signal based as a difference between a target output parametric characteristic (e.g., a predefined optical power) and a measured parametric characteristic (e.g., a measured optical power), and to apply a correction to the output optical signal based on that error. For example, memory 85 may store calibration data (e.g., parameter values) that are usable to correct for hardware, or other, errors in the output circuitry, such as photodiode-introduced errors in output port 77. The selected parametric data and the calibration data 86 are summed via an adder ("Σ"), and the resulting error ("err") applied to proportional (P), integral (I), and derivative (D) components. Each of these components produces an output, which are summed via another adder ("Σ"). The resulting sum 88 constitutes control data that, in this example, is converted into an analog signal 89 by digital-to-analog controller (DAC) 90. This analog signal is a corrected parametric control voltage that is used by the output port to produce the optical signal having parametric characteristics reflecting the selected parametric data as corrected for any errors introduced by signal-generating hardware or other factors, such as temperature. In some implementations, any coefficient of the PID loop can be set to zero to form a variant of the PID loop, such as a PI loop (e.g., by setting D to zero).

The error control loop incorporates output port 77. In some implementations, optical output port 77 may comprise an interface configured to receive an electrical signal (informational content data 67), to receive a signal representing the selected parametric data as corrected, and to generate an optical signal 84 representing the informational content of the electrical signal and having parametric characteristics based on the selected parametric data. In some implementations, output port 77 is also configured to measure parametric information for the output optical signal, such as, but not limited to, optical power level, signal-to-noise ratio, modulation amplitude, extinction ratio, or wavelength. In this example, the measured parametric information 91 represents the optical power level of the optical signal; however, as noted, the parametric information may represent any appropriate parametric characteristic of the optical signal. In this example, channel 62 also includes an analog-to-digital converter (ADC) 94. ADC 94 receives the measured parametric information 91, and converts that information into digital data 95; that is, parametric data. Thus, output port 77 and ADC 94 capture the parametric data, and forward that measured parametric data as an input 94 of the error correction loop 83.

Input 94 receives the measured parametric data 95 and adjusts the measured parametric data based on the calibration data 86 received from memory 85. The result is then combined with the selected parametric data to produce an error ("err") value, and the process described above is repeated to continually correct for error in the output signal relative to a target output. In some implementations, error correction of this type may be used to stabilize output power, and to smooth-out spikes or noise in output power that may be present in the parametric data.

In the example of FIG. 4, the active control loop described is described with respect to an input port 64 and an output port 77. However, the active control loop may be used with any two or more ports to communication channels. For example, the active control loop may be used to control the parametric characteristics of one channel (input or output channel) based on the parametric characteristics of any one other channel (input or output channel). In some implementations, multiple active control loops may be used to control the parametric characteristics of multiple channels (input or output channel) based on the parametric characteristics of any one other channel (input or output channel). In some implementations, multiple active control loops may be used to control the parametric characteristics of one channel (input or output channel) based on the parametric characteristics of multiple other channels (input or output channel). For example, a single channel may produce a signal having the optical power of one channel and the wavelength of another, different channel using two active control loops encompassing the single channel and the two other channels.

In some implementations, the active control loops may be used to implement margin testing, as described herein. For example, a user may specify programmatically that the output power levels are always −5 dBm in one application. In another application, the user may specify programmatically that the output power level should always be 2 dB less than the power on another channel. These example power characteristics may be controlled by providing, and selecting, appropriate parametric data, as described above.

In some implementations, the calibration data of memory 74 comprise multiple calibration data sets. In some implementations, each calibration data set comprises parameter values that are usable to adjust parameter values measured at the communication channel. In some implementations, each calibration data set comprises parameter values that are substitutable for parameter values measured at the communication channel. For example, parameter values may represent values for one or more of the following: optical signal power level, signal-to-noise ratio, modulation amplitude, extinction ratio, wavelength, rise time, fall time, slew rate, or any other characteristic relating to a wave or the wave's shape. In some examples, e.g., where the parameter values relate to an optical signal, the parameter values vary non-linearly relative to each other. For example, optical signal power is typically measured in decibels, which is on an logarithmic (e.g., non-linear) scale. In this example, the parameter values, which are also measured in decibels, vary non-linearly from a smallest parameter value to a largest parameter value non-linearly. The smallest and largest parameter values may be any appropriate values, and may vary in steps of any appropriate sizes. In an example implementation using optical power as an example parameter, the smallest value of optical power supported by the system is −35 decibel-milliwatts (dBm) and the largest value of optical power is +15 dBm. In some implementations, the parameters vary from −35 dbm to +15 dBm in 25 mdB increments. As noted, however, other implementations may use different values, different parameters, and different step sizes.

In some implementations, each calibration data set is associated with a temperature. For example, each calibration data set may be associated with a temperature of its corresponding channel, including, but not limited to, e.g., the temperature of an input or output port on the channel, the temperature of the transmission media/medium of the channel, the temperature of the input and/or output circuitry of the channel, a combination thereof, and so forth. In some implementations, there is a different calibration data set for each one degree Celsius (C) temperature increment. In some implementations, an incremental change of other than one degree Celsius temperature may each have a calibration data set. For example, there may be a calibration data set for each 0.1° C. temperature increment, for each 0.5° C. temperature increment, for each 2° C. temperature increment, for each 3° C. temperature increment, for each 4° C. temperature increment, for each 5° C. temperature increment, and so forth. In some implementations, the calibration data sets may not be dependent upon temperature, or upon temperature alone, but rather may be dependent upon some other environmental variable alone, or in combination with temperature, that could affect circuit or photodiode operation. For example, there may be selectable calibration data set(s) associated with environmental humidity, radio frequency (RF) interference levels, and so forth, either alone or in combination with temperature.

Taking the case of temperature as an example, each calibration data set may be selectable for use based on temperature, as noted. Each channel may have an associated temperature monitor that continually, intermittently, or periodically detects a temperature associated with the channel, and that provides that temperature to a control system to selects a calibration data set indexed to that temperature. In some implementations, the control system may be implemented in an FPGA (e.g., FPGA 73) or other programmable or non-programmable intelligence on the channel itself or external to the channel. In some implementations, the calibration processes can be adjusted without any change to the FPGA logic. In some implementations, only the calibration data may change. In some implementations, a computing system may not meet certain performance requirements for implementation of the control system and may not offer the deterministic operation that a real-time hardware implementation would offer. Implementing the control system directly in hardware may provide a high performance solution with deterministic behavior. For example, a program thread running on a computer utilized to control parametric could have non-deterministic jitter and also be less periodic in time. By contrast, a hardware implementation could be periodic and offer better jitter characteristics than a computing system. However, in some implementations, the control system may be implemented in a computing system.

In some implementations, each calibration data set is implemented in one or more look-up tables (LUTs). However, in some implementations, one or more data storage constructs other than LUTs may be used. For example, arrays, lists, trees, graphs, or other appropriate data structure(s) may store the calibration data sets.

In some implementations, each calibration data set comprises two LUTs; however, any appropriate number of LUTs may be used per calibration data set. In examples where a calibration data set comprises two LUTs, the first LUT stores parameter values in relation to indices. Each index in the first LUT is selectable based on the first parameter. A second LUT stores the indices in relation to calibration values. A calibration value in the second LUT is selectable based on an index selected from the first LUT. Thus, the selection process is two-step in this example.

Figure 5:
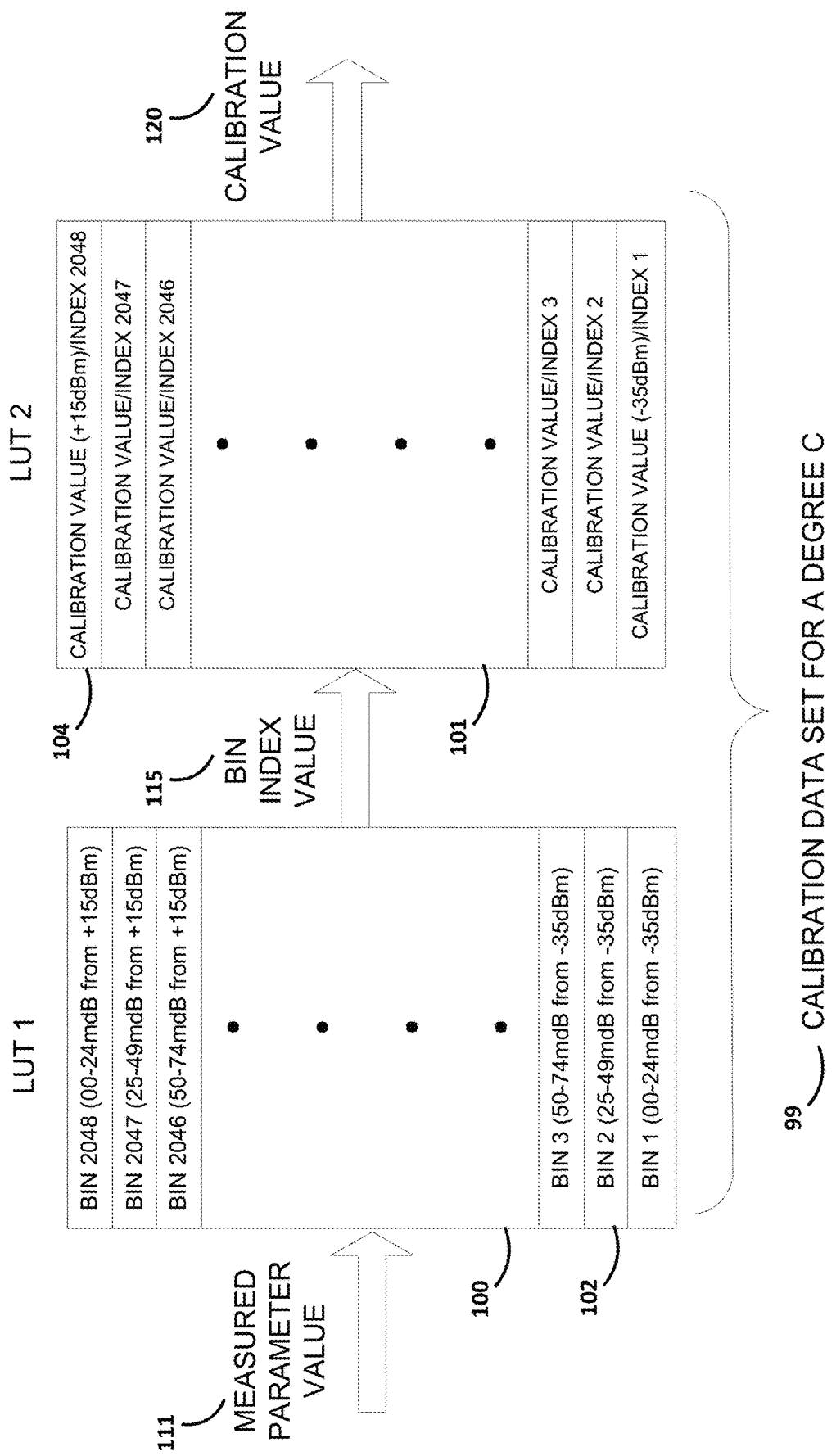
FIG. 5 are block diagrams showing examples of look-up tables that may be used to perform calibration.

FIG. 5 shows, conceptually, examples of the first LUT 100 and the second LUT 101 defining a calibration data 99 set for a random degree Celsius. In this example, first LUT 100 include a number of bins (e.g., bin 102). In an example, there are 2048 bins; however, any appropriate number of bins may be used. The bins each represent a range of parameter values between a maximum parameter value and a minimum parameter value. In this example, the size of each range is the same; however, that need not be the case in some implementations. In an example, the range is 25 mill-decibels (mdB); however, any appropriate range may be used. In some implementations, the ranges are presented to the FPGA in volts. The size of each range may be different when the units are volts instead of decibels.

In some implementations, an index (e.g., a value between 1 and 2048) obtained by accessing the first LUT, as described below, enables access to a calibration value that is usable to correct the parameter measured on the channel, e.g., to perform correction based on temperature or other condition(s) that are associated with selected calibration data set. In an example, the second LUT includes calibration values (e.g., value 104) that are associated with the indices from the first LUT. In some implementations, the calibration values are discrete values that range from the maximum to the minimum in equal-sized steps. For example in some implementations, the maximum value is +15 dBm, the minimum value is −35 dBm, and the step size is 25 mdB; however, in some implementations, different values than those presented herein may be used for the maximum value, the minimum value, and/or the step size value. As noted, the step sizes may be different depending on the units used.

The configuration of the LUTs addresses issues associated with converting parameter values, such as optical power, that are measured on a logarithmic (e.g., non-linear) scale to electrical (e.g., digital signals). In this regard, in some implementations, parametric data that represents the parameter values, and that is processed by the instrument modules, comprises digital data. The digital data is represented by N (N>1) bits. In some implementations, because the parameter values are on a logarithmic scale, the variation between maximum and minimum values may be extraordinarily large. For example, in the case of +15 dBm and −35 dBm, the maximum absolute value is actually $10^{15}$ and the minimum absolute value is $10^{-35}$. Given the large difference between the maximum and minimum values in this example, a relatively large number of bits are required to represent each of those values. In an example implementation, each value is represented by N bits, where N is 24 in this case. Consequently, there are $2^N$ potential different parameter values, or $2^{24}$ different parameter values. LUTs having $2^{24}$ different parameter values would require considerable storage space and would be time-consuming to access. The example configuration of the LUTs described herein reduces the number of entries used in each table to less than $2^N$ entries and, in some implementations, to less than $2^N/1000$ entries or any other appropriate number of entries less than $2^N$. As a result, the LUTs can be accessed more quickly and require less storage on the instrument modules.

More specifically, in some implementations, as explained above, each calibration data set is represented by two LUTs, each having less than $2^N$ entries. In the example of +15 dBm maximum and −35 dBm values, with 24-bit digital representations of those values, each of the two LUTs has 2048 entries, which totaled is considerably less than $2^{24}$ entries. As noted, however, the systems described herein are not limited to any of the numbers specified in these examples. Because the values of the measured parameter are on a logarithmic scale, individual bits in digital representations of those values will have different impacts. For example, for larger parameter values, higher-order bits impact the overall value of the parameter, whereas lower-order bits do not. By contrast, for smaller parameter values, higher-order bits typically are not present and lower-order bits control. For example, of the $2^{24}$ bits representing a +15 dBm value, changes to the lower order bits have little impact on the total value. By contrast, of the $2^{24}$ bits representing a −35 dBm value, changes to the lower order bits will have a considerable impact on the total value. The binning described above allows parameter values to be aggregated in a manner that takes this into account.

Figure 6:
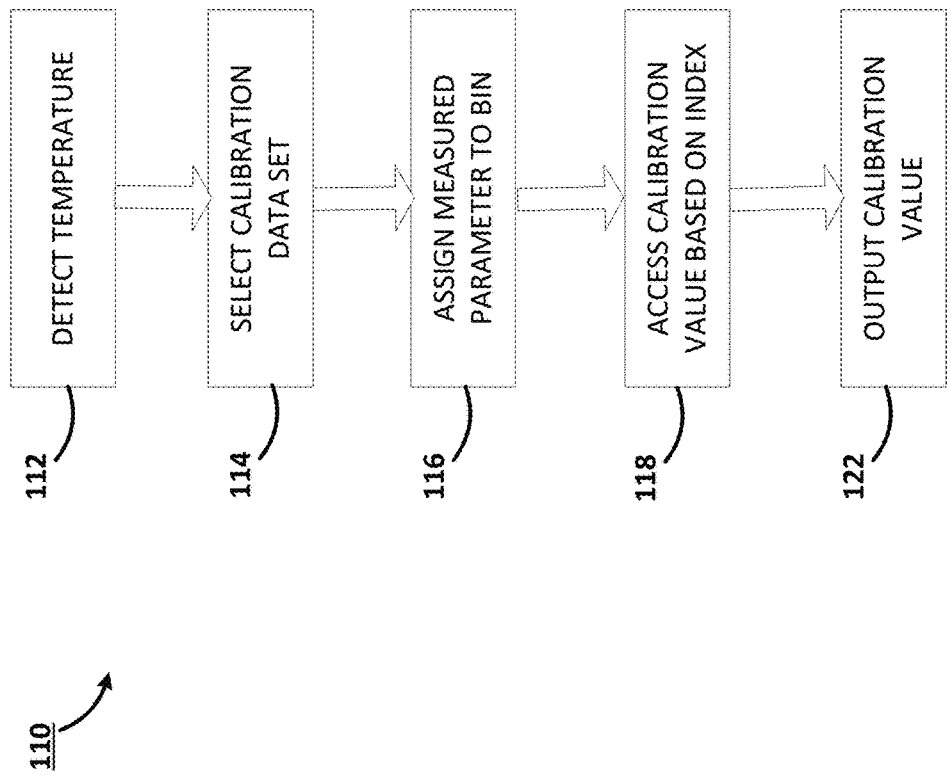
FIG. 6 is a flowchart showing an example calibration correction process.

More specifically, referring also to FIG. 6, during an example calibration process 110, a temperature is detected (112) by a temperature monitor, such as temperature monitor 63 of FIG. 4. The control system selects (114)—in some cases, the selection is performed in real-time—an appropriate calibration data set that corresponds to the detected temperature (e.g., set 99 of FIG. 5). For example, if the detected temperature is 48° C., one calibration data set may be selected; if the detected temperature is 49° C., another, different calibration data set may be selected. In this example, the calibration data set includes two LUTs, such as those described with respect to FIG. 5.

A measured parameter value 111 such as optical power is assigned (116) to one of the 2048 bins of first LUT 100. For example, in the first LUT, the largest parameter values are assigned to the same 25 mdB-wide bin, and so forth in step-sized increments (e.g., 25 mdB increments) on down to the smallest parameter values. In the example of FIG. 5, the bins are related to the maximum and minimum optical powers—in this example, +15 dBm and −35 dBm, respectively. For example, bin 1 is 0 mdB to 24 mdB higher than −35 dBm; bin 2 is 25 mdB to 49 mdB higher than −35 dBm; bin 3 is 50 mdB to 75 mdB higher than −35 dBm; bin 2046 is 50 mdB to 74 mdB lower than +15 dBm; bin 2047 is 25 mdB to 49 mdB lower than +15 dBm; bin 2048 is 0 mdB to 24 mdB lower than +15 dBm; and so forth. The bin number to which the measured parameter value is assigned corresponds to an index value in the first LUT. In this example, the index value an integer from 1 to 2048. The selected index value 115 from the first LUT that corresponds to the bin to which the measured parameter value is assigned is used to access (118) a calibration value 120 in the second LUT 101. More specifically, the second LUT 101 indexes the calibration values to the index value/bin number of the first LUT. The calibration value 120 corresponding to index value 115 is output (122) as the calibration value. In the example implementation of FIG. 5, the calibration values are between +15 dBm and −35 dBm in 25 mdB increments.

In some implementations, such as the example presented above, the calibration value is an actual parameter value—e.g., an optical power value—that is substituted for the measured parameter value during calibration. So, in the above example, the calibration value obtained from the second LUT is substituted for the measured parameter value. In some implementations, the calibration value may be processed to correct the measured parameter value based on the calibration value obtained from the second LUT. For example, the measured parameter value may be added to, subtracted from, multiplied by, divided by, etc. the calibration value. In any case, correction circuitry, which may be implemented in the FPGA 73 or elsewhere, performs whatever processing is appropriate to obtain calibrated values for the measured values. The calibrated values are then used in other processing performed in the system instead of the actual measured values. The calibrated values are typically different from the measured values; however, that need not be the case in situations where the measured values are accurate (e.g., the measured and calibrated values may be the same).

In some implementations, the control system implements a state machine. The state machine may be implemented in processing hardware (e.g., an FPGA) to select the calibration data set. In some implementations, following selection (114) of the calibration data set, the selected calibration data set is moved into cache memory and is not used until an event occurs. Thus, calibration may continue to be performed using a prior calibration data set until a new calibration data set is switched into the designated cache. The prior calibration data set may be switched into a second cache, and the selected calibration data set may take its place. Thereafter, calibration may be performed as described herein using the selected calibration data set.

To summarize, in an example implementation, the system described herein provides real-time temperature-compensated calibration adjustment of non-linear data (e.g., logarithmic data) using linear indexing. The LUTs are sized to support the minimum resolution and the maximum range of the system specification. For example, as described, the system may support power levels with a minimum resolution of 25 mdB over a range of −35 dBm to +15 dBm. Corrected (e.g., calibrated) power values are stored logarithmically in a linear index. The control system, e.g., the FPGA, may fetch those values through a two-stage look-up process. The linear power readings from ADC 69 (FIG. 4) may be utilized to implement a binary search into the first LUT 100 to find the closest bin match. A binary search can be relatively fast. In some implementations, a binary search may be implemented to always require the same number of iterations. In some implementations, the FPGAs described herein implement the search processes to always take the same number of iterations so that timing is consistent. Thus, in some implementations, a binary search provides a way to obtain the results in a deterministic and consistent time frame. When the binary search finds a result, the index of that search is used to index into the cached power values in second LUT 101. In this example, the LUTs are the same size. Since the power values are in sets of 2048 in this example, the binary search should take 12 clock ticks per channel. Receiving and transmitting of data may occur in parallel, but each channel may be calibrated search sequentially. In general, a LUT provides a relatively simple way to store and to recall data that is non-linear or that cannot be described by a simple formula. LUTs also allow for calibration factors discovered late in the design process to be incorporated into the design without changing system firmware.

In some implementations, a coefficient flash ("CoefFlash") stores the calibration values during calibration. The coefficient flash may be structured as follows:

| CoefFlash memory map (address[27:0]): |
|---|
| CoefFlash (256MB Total) |
|   \|_ Factory/Current Power Values (Address[27]) |
|     \|_ 256 Temperatures (Address[26:19]) |
|       \|_ Rx/TX (Address[18]) |
|         \|_ 16 Channels (Address[17:14]) |
|           \|_ Reserved (Address[13]) |
|           \|_ 2K Power Values (Address[12:0]) |

In some implementations, FPGA 73 may cache 2048 power values for each of 16 channels (Address[17:14]) within RX (Address[18]=1) and TX (Address[18]=0). These calibrated power values may be read from a "current" region (Address [27]=0) of the CoefFlash. These cached power values may be updated each time that a port temperature changes. The cache, however, keeps the coefficients associated with the current temperature. In the example of FIG. 7, there are two sets of coefficients so that one set can be updated while the other set is being used. The updates happen when the temperature changes. For example, if the system is using the coefficients stored in Set A 124, Set B 126 will be updated with the new coefficients from the coefficient flash when the temperature changes. After the coefficients have finished loading in Set B, then the system will use the coefficients stored in Set B. If the temperature changes again, then the new coefficients will be loaded into Set A from the coefficient flash. After those coefficients have finished loading, then the system will use the coefficients stored in Set A. In some implementations, the system continues to "ping-pong" back and forth between Set A and Set B each time the temperature changes. In some implementations, three sets of coefficients are cached in three separate caches as opposed to the two shown in FIG. 7. For example, the following may be cached: coefficients for the current temperature, coefficients for the next higher temperature—e.g., 1° C. above the current temperature, and coefficients for next lower temperature, e.g., 1° C. below the current temperature. As a result, in some implementations, there is not a need to wait for the cache to load. Loading the cache can occur in the background in anticipation of the next temperature change.

In some implementations of the circuitry described herein, multiple optical transmission media (e.g., multiple optical fibers) may be used to provide at least informational content to a single electrical transmission medium (e.g., a wire). In some implementations of the circuitry described herein, multiple optical transmission media may be used to receive at least informational content from a single electrical transmission medium. In some implementations of the circuitry described herein, multiple electrical transmission media (e.g., multiple wires) may be used provide at least informational content to a single optical transmission medium (e.g., an optical fiber). In some implementations of the circuitry described herein, multiple electrical transmission media may be used to receive at least informational content from a single optical transmission medium. In some implementations of the circuitry described herein, the same circuitry may include one or more optical transmission media and one or more electrical transmission media to provide at least informational content to a single electrical transmission medium. In some implementations of the circuitry described herein, the same circuitry may include one or more optical transmission media and one or more electrical transmission media to receive at least informational content from a single electrical transmission medium. In some implementations of the circuitry described herein, the same circuitry may include one or more optical transmission media and one or more electrical transmission media to provide at least informational content to a single optical transmission medium. In some implementations of the circuitry described herein, the same circuitry may include one or more optical transmission media and one or more electrical transmission media to receive at least informational content from a single optical transmission medium.

In the examples described herein, processing of data is performed in the electrical domain. However, in some implementations, all or part of the processing may be performed in the optical domain using appropriate optical circuitry.

The system and features described herein may be implemented as, or be part of, automatic test equipment (ATE). ATE refers to an automated, usually computer-driven, system for testing devices. ATE typically includes a computer system, such as that shown in FIG. 1, and one or more instrument modules (e.g., as shown in FIG. 1) or a single device having corresponding functionality. In an example operation, in response to instructions in a test program set (TPS), some ATE automatically generates input signals to be applied to a UUT, and monitors output signals from the UUT. In some implementations, pin electronics in the ATE compares the received output signals with expected responses (e.g., threshold) to determine whether the UUT is defective or has passed a test. In an example, an instrument module outputs voltage and/or current to the UUT, and receives voltage and/or current from the UUT. For example, in some implementations, ATE may be capable of forcing voltage to a UUT and sourcing current to the UUT. In some implementations, the ATE is capable of providing test signals to a UUT, receiving response signals from the UUT, and forwarding those response signals for processing to determine whether the UUT meets testing qualifications. Signals are transmitted between the ATE and the UUT over the communication channels described herein. The test and response signals may be processed as described herein, e.g., to identify their informational and parametric content, to distribute data representing the informational and parametric content, and so forth.

Taking the case of optical power as an example, optical pin electronics in a channel may provide sourcing and measuring capabilities on each channel to control optical power level. In some implementations, the average optical output power is regulated to a desired static or dynamic level. A static level includes a value specified by a user. A dynamic level includes a power level that is related to a measured power level of an external or internal reference. For example, the optical power on one channel may be controlled based on parametric data representing the optical power on another channel. For example, any appropriate parameter on one channel may be controlled based on parametric data for another channel. In general, since the measured parameters on one channel can be used to produce a signal on another channel, the system described herein can be used simulate signal attenuation and/or signal amplification in some implementations. Optical pin electronics in each channel also supports programmatic control of the modulation amplitude of the optical output.

In some implementations, test signals may be sent over multiple channels and test results may be based on response signals received from multiple channels. In some implementations, test signals may be sent over a single channel and test results may be based on response signals received from a single channel. In some implementations, test signals may be sent over a multiple channels and test results may be based on response signals received from a single channel. In some implementations, test signals may be sent over a single channel and test results may be based on response signals received from multiple channels. The circuitry described herein may be programmed, e.g., by a user at a host computing system or a test program set to send test signals over, and receive response signals from, a single channel or multiple channels as desired.

In general, the circuitry described herein for generating optical signals for output may include any appropriate device, such as one or more lasers or light-emitting diode(s) (LEDs) or a vertical-cavity surface-emitting laser (VCSEL).

Testing performed using the example systems described herein may be implemented using hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The techniques described herein may be performed by systems or any other appropriate computing device. The techniques can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" or "optical connection" as used herein may imply a direct physical connection or a wired or wireless connection that includes or does not include intervening components but that nevertheless allows signals to flow between connected components. Any "connection" involving electrical circuitry or optical components mentioned herein that allows signals to flow between two points, unless stated otherwise, is not necessarily a direct physical connection regardless of whether the word "electrical" or "optical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
   one or more non-transitory machine-readable storage media storing calibration data sets, a calibration data set among the calibration data sets comprising parameter values that vary non-linearly, each of the calibration data sets being temperature-specific;
   channels over which signals pass to and from units under test (UUTs), a channel among the channels comprising:
   input circuitry to receive a signal of the signals and to obtain a first parameter based on the signal; and
   correction circuitry to obtain a second parameter based on the first parameter and based on the calibration data set, the second parameter comprising a calibrated version of the first parameter, the calibration data set being selectable from among the calibration data sets based on temperature;

wherein the calibration data set comprises ranges of values of the first parameter that are binned based on which bits used to represent the values of the first parameter have a greatest impact on a value of the first parameter, with each bin being associated with an index, and wherein the calibration data set comprises calibration values that are selectable to produce the second parameter based on an index associated with a range of values of the first parameter.

2. The system of claim 1, further comprising:
a temperature monitor that is configured to monitor the temperature in real-time, the temperature being the temperature of the channel, the temperature from the temperature monitor being usable to select the calibration data set.

3. The system of claim 1, wherein the input circuitry is configured to obtain the first parameter by measuring the signal.

4. The system of claim 1, wherein the first parameter comprises a first optical power value, and the second parameter comprises a second optical power value, the second optical power value being different from the first optical power value.

5. The system of claim 1, wherein the input circuitry is configured to receive the signal, to convert the signal into a digital signal, and to obtain the first parameter based on the signal, the first parameter comprising one or more signal characteristics other than informational content.

6. The system of claim 5, wherein the first parameter comprises one or more of the following information about the signal: power level, signal-to-noise ratio, modulation amplitude, extinction ratio, wavelength, rise time, fall time, or slew rate.

7. The system of claim 1, further comprising:
processing hardware to implement a state machine; and cache memory;
wherein the state machine is configured to move the calibration data set into the cache memory, and to control the system to use the calibration data set in the cache memory following an event.

8. The system of claim 1, wherein the signal is an optical signal.

9. A system comprising:
one or more non-transitory machine-readable storage media storing calibration data sets, a calibration data set among the calibration data sets comprising parameter values that vary non-linearly, each of the calibration data sets being temperature-specific;
channels over which signals pass to and from units under test (UUTs), a channel among the channels comprising:
input circuitry to receive a signal of the signals and to obtain a first parameter based on the signal; and
correction circuitry to obtain a second parameter based on the first parameter and based on the calibration data set, the second parameter comprising a calibrated version of the first parameter, the calibration data set being selectable from among the calibration data sets based on temperature;
wherein the calibration data set comprises indices based on ranges of values of the first parameter and calibration values that are selectable based on the indices and that are used to produce the second parameter;

wherein each calibration data set is stored in lookup tables (LUTs), the calibration data set comprising:
a first LUT storing parameter values in relation to the indices, a first index among the indices being selectable based on the first parameter; and
a second LUT storing the indices in relation to the calibration values, a calibration value among the calibration values being selectable based on the first index, the second parameter being based on the calibration value.

10. The system of claim 9, wherein the indices of the first LUT each correspond to a different bin among a number of bins, each different bin corresponding to a different range of parameter values between a maximum parameter value and a minimum parameter value, a size of each range being the same, the first parameter being within one of the bins that corresponds to the first index.

11. The system of claim 10, wherein each of the parameter values are represented by a same number of bits, and wherein there is a non-linear relationship between a smallest of the parameter values and a largest of the parameter values.

12. The system of claim 11, wherein the number of bits of each parameter value represents a binary number, and wherein lower order bits affect selection of a smaller parameter value more than the lower order bits affect selection of larger parameter value.

13. The system of claim 9, wherein each of the parameter values is represented by N bits resulting in a possible $2^N$ parameter values where N>1; and
wherein each of the first LUT and the second LUT has less than 2N entries.

14. The system of claim 13, wherein each of the first LUT and the second LUT has less than $2^N/1000$ entries.

15. The system of claim 9, further comprising:
a temperature monitor to obtain the temperature of the channel; wherein the first LUT and the second LUT are selectable in real-time based on the temperature obtained by the temperature monitor.

16. The system of claim 9, further comprising:
a temperature monitor that is configured to monitor the temperature in real-time, the temperature being the temperature of the channel, the temperature from the temperature monitor being usable to select the calibration data set.

17. The system of claim 9, wherein the input circuitry is configured to obtain the first parameter by measuring the signal.

18. The system of claim 9, wherein the first parameter comprises a first optical power value, and the second parameter comprises a second optical power value, the second optical power value being different from the first optical power value.

19. The system of claim 9, wherein the input circuitry is configured to receive the signal, to convert the signal into a digital signal, and to obtain the first parameter based on the signal, the first parameter comprising one or more signal characteristics other than informational content.

20. The system of claim 9, wherein the first parameter comprises one or more of the following information about the signal: power level, signal-to-noise ratio, modulation amplitude, extinction ratio, wavelength, rise time, fall time, or slew rate.

21. The system of claim 9, further comprising:
processing hardware to implement a state machine, and cache memory;
wherein the state machine is configured to move the calibration data set into the cache memory, and to control the system to use the calibration data set in the cache memory following an event.

22. The system of claim 9, wherein the signal is an optical signal.

23. A method comprising:
storing calibration data sets in one or more non-transitory machine-readable storage media, a calibration data set among the calibration data sets comprising parameter values that vary non-linearly, each of the calibration data sets being temperature-specific;
selecting the calibration data set based on temperature associated with a communication channel,
receiving a signal over the communication channel;
obtaining a first parameter based on the signal; and
obtaining a second parameter based on the first parameter and based on the calibration data set, the second parameter comprising a calibrated version of the first parameter;
wherein the calibration data set comprises ranges of values of the first parameter that are binned based on which bits used to represent the values of the first parameter have a greatest impact on a value of the first parameter, with each bin being associated with an index, and wherein the calibration data set comprises calibration values that are selectable to produce the second parameter based on an index associated with a range of values of the first parameter.

24. The method of claim 23, wherein the signal is an optical signal.

25. A method comprising:
storing calibration data sets in one or more non-transitory machine-readable storage media, a calibration data set among the calibration data sets comprising parameter values that vary non-linearly, each of the calibration data sets being temperature-specific;
selecting the calibration data set based on temperature associated with a communication channel;
receiving a signal over the communication channel;
obtaining a first parameter based on the signal; and
obtaining a second parameter based on the first parameter and based on the calibration data set, the second parameter comprising a calibrated version of the first parameter;
wherein the calibration data set comprises indices based on ranges of values of the first parameter and calibration values that are selectable based on the indices and that are used to produce the second parameter;
wherein each calibration data set is stored in lookup tables (LUTs), the calibration data set comprising:
a first LUT storing parameter values in relation to the indices, a first index among the indices being selectable based on the first parameter; and
a second LUT storing the indices in relation to the calibration values, a calibration value among the calibration values being selectable based on the first index, the second parameter being based on the calibration value.

26. The method of claim 25, wherein the indices of the first LUT each correspond to a different bin among a number of bins, each different bin corresponding to a different range of parameter values between a maximum parameter value and a minimum parameter value, a size of each range being the same, the first parameter being within one of the bins that corresponds to the first index.

27. The method of claim 26, wherein each of the parameter values are represented by a same number of bits, and wherein there is a non-linear relationship between a smallest of the parameter values and a largest of the parameter values.

28. The method of claim 27, wherein the number of bits of each parameter value represents a binary number, and wherein lower order bits affect selection of a smaller parameter value than the lower order bits affect selection of larger parameter value.

29. The method of claim 25, wherein each of the parameter values is represented by N bits resulting in a possible $2^N$ parameter values where N>1; and wherein each of the first LUT and the second LUT has less than $2^N$ entries.

30. The method of claim 25, wherein the signal is an optical signal.

* * * * *